US006988559B2

(12) United States Patent
Holy

(10) Patent No.: US 6,988,559 B2
(45) Date of Patent: Jan. 24, 2006

(54) BEET HARVESTER APPARATUS

(76) Inventor: Mark Holy, 2129 8th St. SE., East Grand Forks, MN (US) 56721

( * ) Notice: Subject to any disclaimer, the term of this patent is extended or adjusted under 35 U.S.C. 154(b) by 75 days.

(21) Appl. No.: 10/677,992

(22) Filed: Jan. 2, 2003

(65) Prior Publication Data
US 2004/0244353 A1    Dec. 9, 2004

Related U.S. Application Data

(60) Provisional application No. 60/418,086, filed on Oct. 12, 2002.

(51) Int. Cl.
*A01D 25/00*    (2006.01)
(52) U.S. Cl. .............................. 171/58; 171/45; 171/46; 56/327.1
(58) Field of Classification Search .................. 171/58, 171/45, 46, 88, 95, 89, 25, 26, 28, 30, 31, 171/38; 198/314, 511, 510.1, 512, 574, 606, 198/456, 458, 597, 370.06; 56/327.1
See application file for complete search history.

(56) References Cited

U.S. PATENT DOCUMENTS

| 2,972,383 | A | * | 2/1961 | Erdman | 171/58 |
| 3,294,177 | A | * | 12/1966 | Schaal et al. | 171/42 |
| 3,792,733 | A | * | 2/1974 | Crandall et al. | 171/58 |
| 4,049,058 | A | * | 9/1977 | Eisenhardt et al. | 171/58 |
| 4,753,297 | A | * | 6/1988 | Mayeda et al. | 172/4 |
| 5,387,155 | A | * | 2/1995 | Dietz | 460/132 |

* cited by examiner

*Primary Examiner*—Victor Batson
(74) *Attorney, Agent, or Firm*—Robert E. Kleve

(57) ABSTRACT

The invention comprises a beet harvesting device. The device has a first plurality of pairs of laterally positioned harvesting discs, and a second pair of laterally positioned harvesting discs, with the second pair being spaced longitudinally from the first plurality of pairs of discs and laterally between the paths of the first plurality of pairs of harvesting discs so that beets may be harvested in a path between the first plurality of pairs of discs, to thereby provide a novel apparatus for more readily harvesting beets in paths narrower than customarily harvested with a first plurality of pairs of laterally positioned harvesting discs.

4 Claims, 5 Drawing Sheets

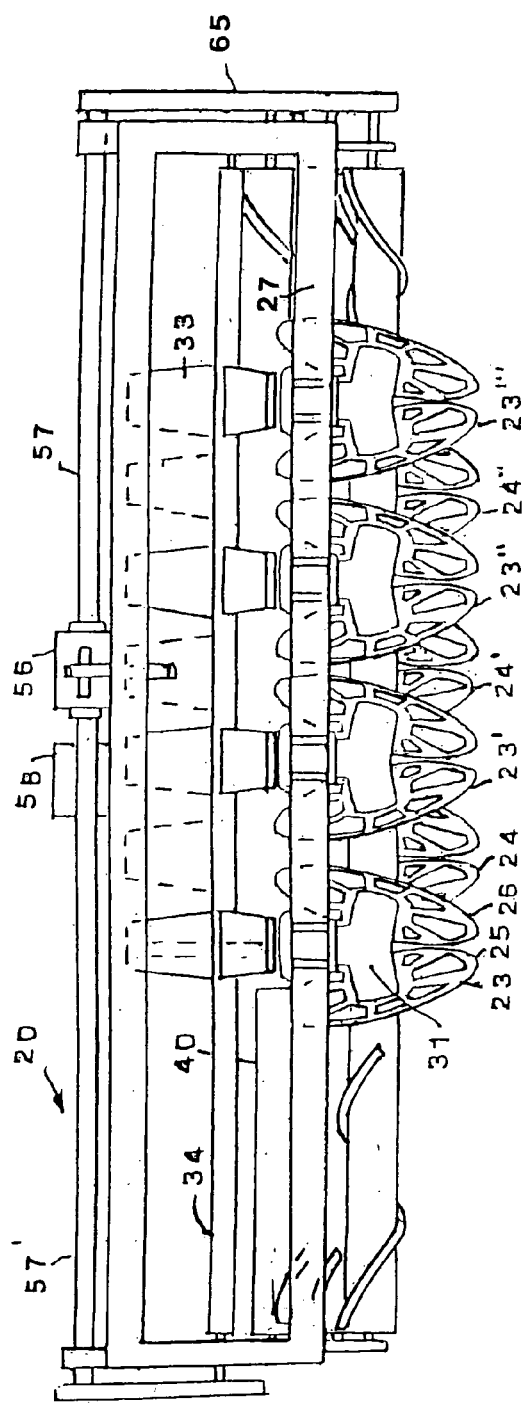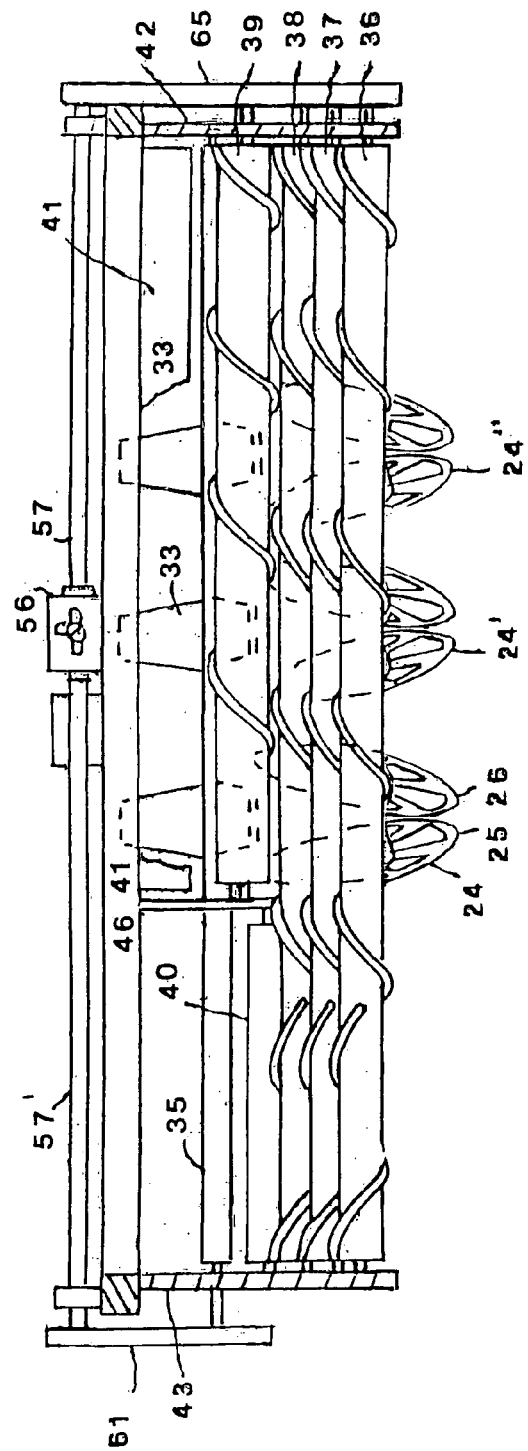

US 6,988,559 B2

BEET HARVESTER APPARATUS

This invention relates to harvesters, more particularly, this invention relates to beet harvesters and the like. The subject matter of this application is essentially the same as my earlier U.S. Provisional patent application Ser. No. 60/418,086, Filed: Oct. 12, 2002, entitled: Beet Harvester Apparatus. The priority benefits of the earlier filing date of this provisional application are hereby claimed.

It is an object of the invention to provide a novel beet harvester which provides a dual set of beet digging discs mounted on a mobile frame with a second set of digging discs mounted behind and between the first set of digging discs, and with the second set of discs aligned between the path of the first set of discs, so that beets may be planted in rows narrower than the customary space between each set of discs of the first set, and so that the first set of discs may engage and dig beets aligned in a first plurality of rows, and the second set of discs may engage and dig beets aligned in a row between the first plurality of rows of beets.

It is a further object of the invention to provide a novel beet harvester having a first plurality of pairs of laterally positioned harvesting discs, and a second pair of laterally positioned harvesting discs, with the second pair being longitudinally spaced from the first plurality of pairs of discs and laterally between the paths of the first plurality of pairs of harvesting discs so that the beets may be harvested in a path between the first plurality of pairs of discs to thereby provide a novel apparatus for more readily harvesting beets in paths narrower than customarily harvested by a first plurality of laterally positioned harvesting discs.

In the past, the beet harvesters have been made or provided with a single lateral row of beet digging discs which were adjustably mounted along the single lateral extending row. As a result, when it was desired to harvest beets with such harvesters, it was found that the discs when placed as close as possible to one another the spacing between each pair of discs was limited to the closeness of the discs to one another. In other words, the spacing between the beets was limited by the space taken up by the pair of discs and their mountings between the beets, which in conventional discs is greater than the space of the ground otherwise necessary between each beet for proper growth of the beets.

By placing a second row of pairs of discs behind the first row, it has enable the disc's position not to be limited in this manner, as the discs easily be placed between the first pair of discs in the first row by placing the second row of discs behind the first row.

Further objects and advantages of the invention will become apparent as the description proceeds and when taken i conjunction with the accompanying drawings wherein:

BRIEF DESCRIPTION OF THE DRAWINGS

FIG. 4 is a front view of the invention taken along line 4—4 of FIG. 2.

FIG. 5 is a cross sectional view taken along line 5—5 of FIG. 2.

BRIEF DESCRIPTION OF THE PREFERRED EMBODIMENT

Briefly stated, the invention comprises a beet harvester having a mobile frame with a first plurality of pairs of laterally positioned harvesting discs and a second pair of laterally positioned harvesting discs. The second pair of harvesting discs being spaced longitudinally from the first pair of harvesting discs and laterally between the paths of the first plurality of pairs of harvesting disc so that beets may be harvested by the discs by the first plurality of discs and beets may also be harvested by the second plurality of harvesting discs in a path between the first pair of discs.

Figure 1:
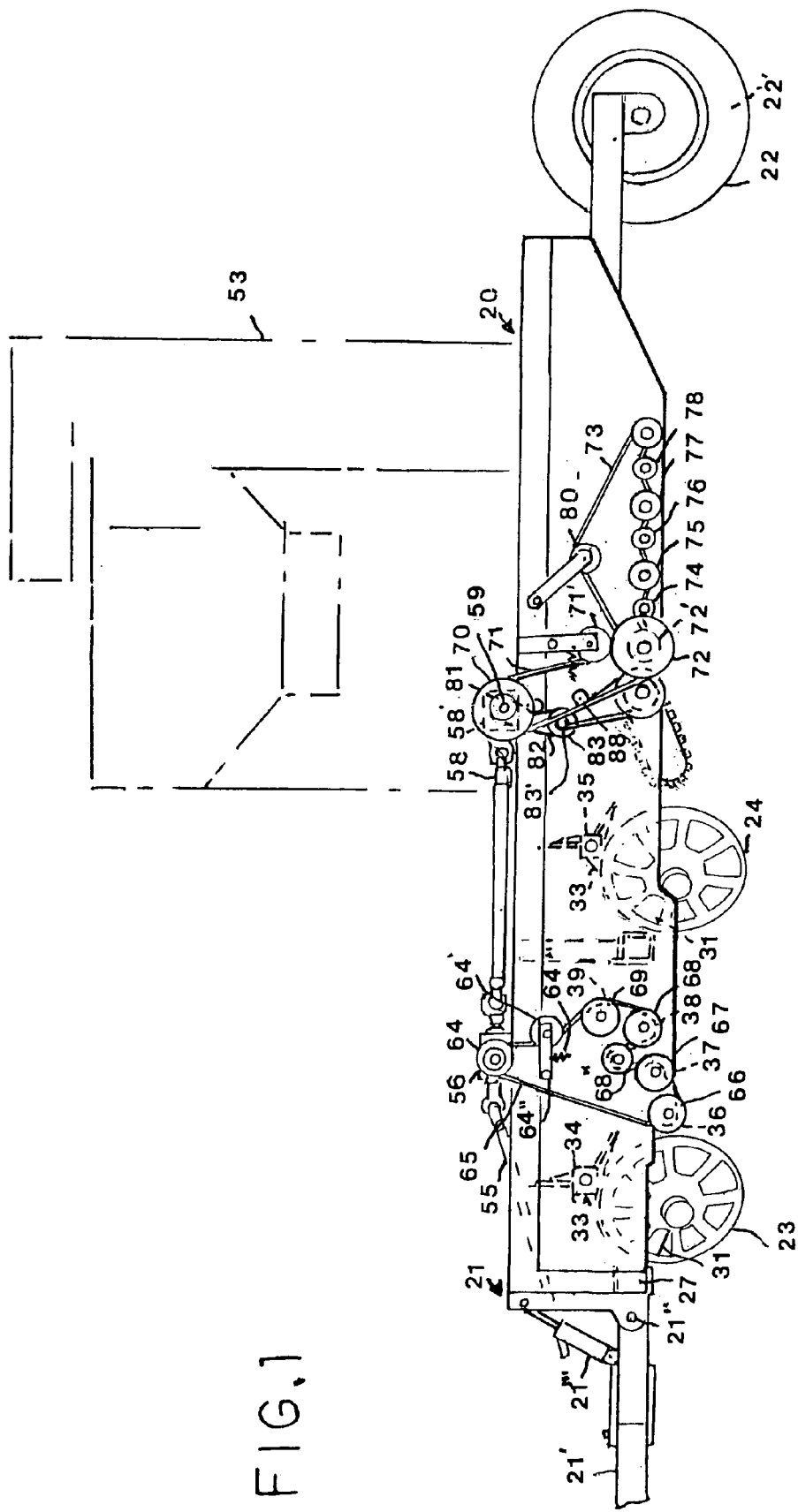
FIG. 1 is a left side elevational view of the beet harvesting invention.
Figure 2:
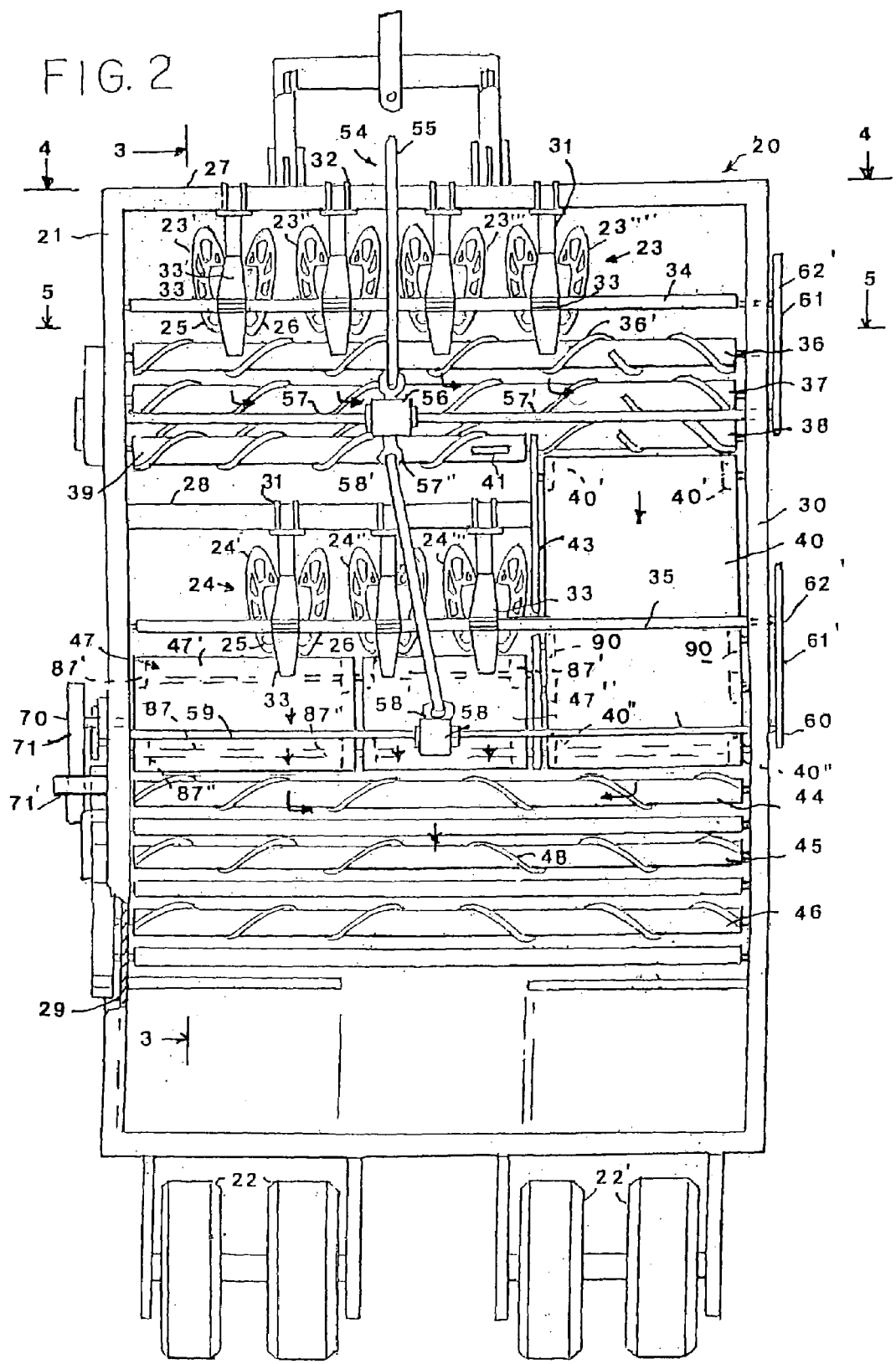
FIG. 2 is a top plan view of the beet harvesting invention.
Figure 3:
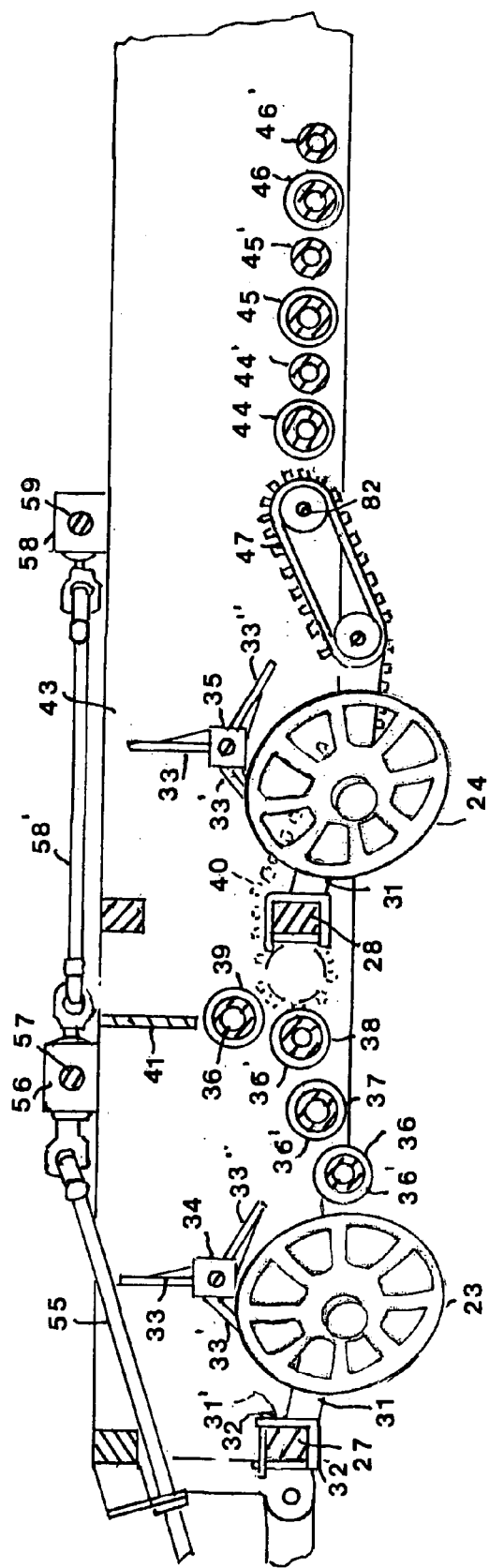
FIG. 3 is an enlarged side elevational view along line 3—3 of FIG. 2 of the invention.

Referring more particularly to the drawings, in FIGS. 1–3, inclusive, the beet harvesting invention 20 is illustrated having a frame 21, and a towing arm 21' mounted to the forward end of the frame, and a pair of supporting wheels 22 and 22' rotatably mounted to the rear of the frame.

A first set of four pairs 23, 23', 23", and 23'" of digging discs 25 and 26 are mounted to a lateral rod 27 fixed across the frame 21. A second set of three pairs of 24, 24' and 24" of digging discs 25 and 26 are mounted to a lateral rod 28 fixed across the frame 21, behind and between the front first pair of four digging discs 25 and 26 on the frame. The lateral rods 27 and 28 are fixed laterally between the parallel side frame members 29 and 29' of the frame 21. Each pair of discs 25 and 26 each are rotatably mounted on a rod 31 which extends forward from each pair of discs with its forward end 31 mounted along the rods 27 and 28 by bolts 32.

The discs and their rods 31 are mounted to rods 27 and 28 and are slidable along the rods 27 and 28 to their selected positions on the rods and they are bolted in a fixed position, as shown in FIG. 2. The mounting structure including the bolts are conventional structure.

Mounted above each pair of discs are three paddles 33, 33' and 33" which are mounted about a circle and are fixed about rods 34 and 35, respectively. The digging disc structure including the discs 25 and 26 rotate in the ground from their reaction with their engagement with the ground as the frame is towed through a field along rows of beets being harvested and the discs rotate in the ground by their engagement with the ground. The discs are spaced close enough to one another at their bottoms as generally shown so as to be closer to one another than the diameter of the beets so that the lower concave edges of the discs engage the beets below the tops of the beets at their narrower diameter from opposite sides below the ground and draw the beets upward and rearward out of the ground.

The paddles 33 are powered to rotate in between each pair of discs to push the beets dug by the discs rearward and upward out of the discs once the discs have draw the beets out the ground. The beets once pushed rearward and upward out of the discs will engage the four spiral ridges rollers 36, 37, 38, and 39 which are powered to rotate clockwise when viewed from FIG. 2 to auger the beets from the left side of the frame toward the right side of the frame 21 when viewed from FIG. 2. Once the beets reach the right side of the frame, the spiral pitch of the spiral ridges 36' on the augers changes, as shown, to cause the beets to be augered rearward along the right side of the frame onto the link chain conveyor belt 40 immediately behind the three augers. The conveyor belt is also powered rotate clockwise when viewed from FIG. 3 to convey the beets rearward on the frame past the three second set of discs.

The pair of digging discs of the first set are each mounted rotatably to a supporting arm or rod 31 at the rearward end 31' of the supporting arm. The forward end 31" of each supporting arm of the discs is mounted to the frame. The arms have projecting flanges 32' with U bolts 32 surrounding a horizontal front post 27 and locking the supporting arm to the horizontal front post. The front post is fixed between the side members 29 and 30 of the main frame 21. The U bolts have a U shaped rod with nuts threaded onto the bolts to bolt the supporting arms to the front horizontal member 27, with the bolts being loosened by loosening the bolts to allow the supporting arm to be slid along the horizontal post to a different location along the post and the nut may then be tightened to lock the supporting arm and digging discs at their adjusted location on the horizontal posts.

Four auger rollers 36, 7, 38, 39 are rotatably mounted behind the front four pairs of digging discs to auger beets drawn out of the ground by the rotating discs 25 and 26 of the front four pairs of digging discs 23. The four auger rollers or rods auger the beets dug from the ground by the discs, from left to the right, when viewed from FIG. 2, toward the right side of the augers and the frame. The first three augers 36, 37, 38 are longer than the fourth auger 39 and extend to the far right side 30 of the frame, in front of the belt conveyor 40. The fourth auger 39 extends only to the wall 43 which separates the second set of discs from the conveyor 40. The fourth auger 39 is pivotally mounted in the wall 43. The augers have conventional spiral ridges 36'. The spiral pitch of the auger ridges 36' of the augers 36, 37, and 38 at the very right end of these augers is reversed from the pitch on the left and center of the augers. The spiral pitch of auger 39 is the same pitch as the left and centers of the augers 36, 37, and 38 so that they all auger the beets from behind the first set of discs to the front of the conveyor 40.

This reverse pitch of augers 36, 37, and 38 along right side from their left and center portions causes the beets, when they reach the right side of these augers, being augered and urged rearward by these augers onto a conveyor 40, which conveyor is immediately behind the right side of the three augers.

Figure 6:
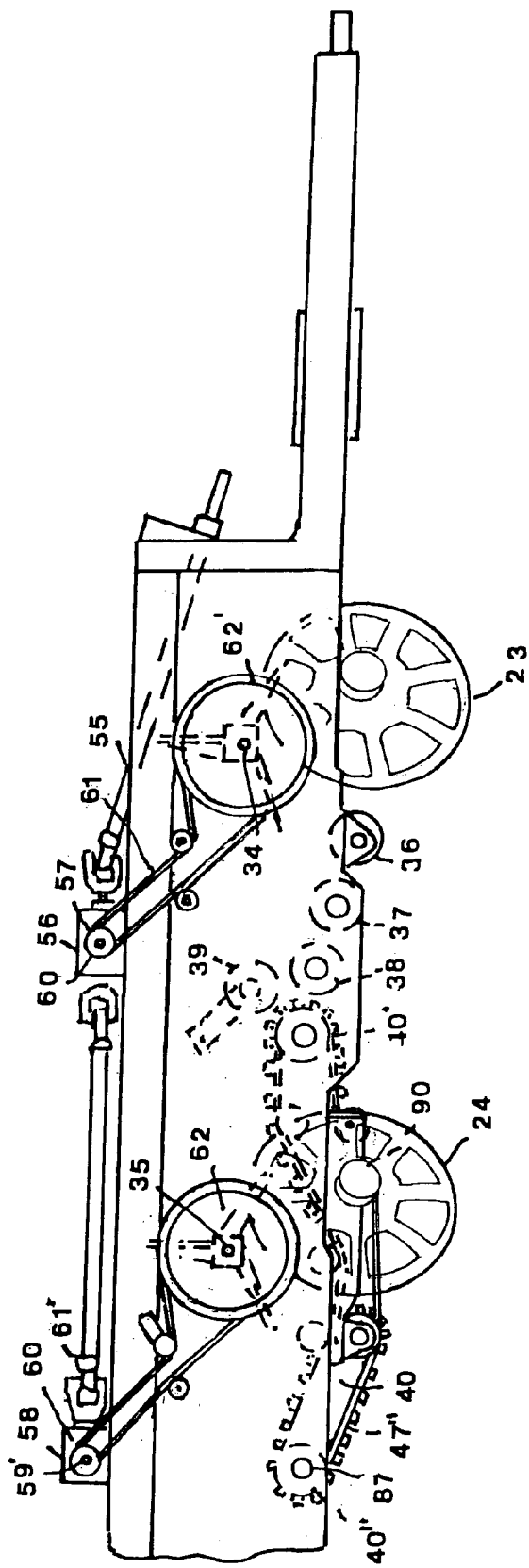
FIG. 6 is a left side elevational view of the beet harvesting invention.

The belt conveyor 40 is beside the second set of discs and extends rearward. The wall 43 runs between the belt conveyor 40 and the second set of discs 24–24" to separate the conveyor from them. The belt 40 is of a conventional endless construction with spaced lateral ribs and is power driven to rotate counter clockwise, when viewed from FIG. 6, to move the beets rearward from the four augers of the first set of discs along the frame past the second set of discs 24–24" to the rear auger rollers 44–46. Mounted behind the front set of digging discs and behind the four augers 36–39 is the second set of three pairs of digging discs 24, 24', 24' which are also rotatably mounted to the rear end 31' of supporting arms 31. The front end of the supporting arms are bolted to the second horizontal rectangular post 28 fixed horizontally across the frame, from the left side of the frame 29 laterally across and between the upper and lower portions of belt 40 to the right side 30 of the frame where the horizontal post is fixed to the frame 21.

A conveyor belt structure 47 is rotatably mounted on the frame behind the second set of digging discs. The conveyor belt structure 47 is made in two sections 47' and 47" is of conventional construction with spaced rib construction and which are mounted on common a dual pair of end rollers 87' and 87". The conveyor belts 47' and 47" receive beets dug out of the ground by the second set of discs 24, 24', 24" and rotate clockwise when viewed from FIG. 2, to convey them rearward, when viewed from FIG. 2, onto the left side of the three augering rollers 44, 45, and 46. The auger rollers 44, 45, and 46 receive the beets from the belt 47 and rotate axially clockwise when viewed from FIG. 3 and the spiral ribs 52 auger them laterally along the frame from left to right, when viewed from FIG. 2, to the center of the frame, which construction is of the type customarily found in single row disc harvesters. From this point, the beets are customarily elevated by elevating structure as shown in phantom lines.

While the belt conveyor 40 on the right side of the frame conveys deposits the beets from the front or first set of discs rearward onto the right side of the augering rollers 44, 45, and 46. The auger rollers 44–46 in rotating their spiral ribs then auger the beets, from right to left, to the center of the augering rollers 44, 45, and 46. The spiraling of the ribs 52 on the three augers in the center of the augers causes the beets at the center of the augers to be augered rearward onto a conventional beet elevating mechanism 53 shown in phantom lines. The elevating mechanism which is conventional elevates the beets onto a conventional upper conveyor which conveys the beets off the harvesters into the boxes of trucks to haul the beets to storage bins and the like.

The power take off mechanism 54 for the harvester 20 has a power take off shaft 55 rotatably mounted to the front of the frame and receives rotational power from the power take off of the tractor, not shown, which tows the harvester through the field for harvesting the beets.

The power take off shaft 55 conveys rotational power to the first gear box 56, through universal joints. The first gear box 56 has opposing side output shafts 57 and 57' and a rear output shaft 57". The rear output shaft 57" of the gear box 56 is connected to a input shaft 58' of a second gear box 58 by a second drive shaft 59 through U joints. The second gear box 58 also has opposing output shafts 59 and 59'.

The output shafts 57' and 59' of the first and second gear boxes extend to the right side of the frame to gears 60 and gears 60 drive chains 61 and 61' to drive the input gears 62 and 62' which are fixed to shafts 34 and 35, respectively, for powering the rotation of the first and second set, respectively, of paddles 33 for the first and second set of digging discs to rotate the paddles between the first and second set of discs.

The output shafts 57 and 59 of the first and second gear boxes extend to left side of the frame to the conveyor belts and auger rollers transmit power from the gear boxes to the left side of the frame to power the conveyor belts and auger rollers for both the first and second set of discs.

The output shaft 57 has a pulley 64 which drives a belt 65 and the belt 65 drives pulleys 66, 67, 68", 68, 69 by extending along the same side of pulleys 66 and 67 then looping about idler pulley 68'" and then extending along the same side of pulleys 68 and 69 to drive the four pulleys 66, 67, 68, 69 which are connected axially to the four augers 36–39 to drive, respectively, these four augers 36–39 behind the first set of discs, clockwise, when viewed from FIG. 3.

A spring loaded tension pulley 64' is pivotally mounted to the side of the frame at pivot 64", with a spring 64'" urging the pulley clockwise about the pivot against belt 65 to keep the belt 65 taut.

The output shaft 59 of the second gear box drives the pulley 70 on the left side 29 of the frame which drives a belt 71 and the belt 71 drives pulley 72. A tension pulley 71' is urged clockwise against belt 71 to keep the belt 71 taut. The pulley 72 has a coaxial reduction pulley 72' fixed hereto which auger 44 and also drives a belt 73 which drives pulleys 74, 75, 76, 77, 78 which drive the other two auger rollers 45, 46 with spiral ridges 44–46 rotating clockwise when viewed from FIG. 2. It also drives the three smooth rollers 44', 45', 46' between the spiral or auger rollers counterclockwise when viewed from FIG. 2.

The rear three auger rollers and three smooth rollers operation is customary in a single row disc harvester. The three auger rollers 44–46 act to drive the beets toward the center of the frame, while the three smooth rollers 44'–46' merely act to dislodge dirt from the beets. A tension pulley 80 is urged counterclockwise against belt 73 to keep belt 73 taut.

The output shaft 59 also drives the pulley 81 which drives the belt 82 drives the pulley 83 which, through the reduction pulley 83', drives belt 84 which drives pulley 85, and through reduction pulley 86 drives the shaft 87 and the shaft 87 has the dual pair of rollers 87" fixed thereto which rotatably support the rear of the conveyor belts 47' and 47" and drive belts 47' and 47" of the conveyor belt behind the second set of discs on the left side of the frame. The shaft 87 also drives as well the conveyor 40 at the right side of the frame by the shaft 87 extending through the conveyor 40 by rollers 40" fixed to the shaft 87 which rotatably support the rear of the conveyor 40 and drive the conveyor 40. The ends of the shaft 87 are rotatably mounted in the sides 29 and 30 of the frame. A front dual pair of rollers 87' support the front of conveyor belts 47' and 47". A pair of rollers 40' rotatably support the front of conveyor 40. A conventional tension pulley 88 is also provided to be urged clockwise by a spring to keep the belt 84 taut.

Guide rollers are also mounted on the wall 30 to guide the chains 61 and 61'.

The towing arm 21' is pivotally mounted to the frame 21 about the pivotal axis 21" and is hydraulically controlled by a pair of hydraulic cylinders 21''' connected by hydraulic lines connected to the towing tractor so that the frame can be pivoted downward or upward when positioning the discs to a suitable level in the ground suitable for digging the beets out of the ground with the discs when the frame is being towed by the tractor.

A wall 41 is mounted to a lateral top beam member 41' fixed across the frame and extends downward behind the first set of four pairs of discs, directly above the fourth auger 39 and drapes down to at least near the auger 39 and acts to prevent beets dug by the first set of four pairs of discs from traveling over the top of the auger and causes beets deposited upon the four augers to travel laterally along the augers to a position in front of the conveyor 40, so that they may be augered rearward by the augers onto the conveyor 40. While the panel member or wall may be solid, it is also customary in the field to provide a plurality of spaced vertical rods instead to serve as a wall to cause or guide the beets to follow a certain path.

The beets thereby move in generally the path as shown by the arrows in FIG. 2, from the first set of digging discs rearward onto the four augers, then laterally along the augers to the front of the side conveyor then rearward on the side conveyor onto the rear augers, while the beets from the second set of digging discs move rearward onto the conveyor then rearward onto the left side of the rear augers, where the rear augers auger the beets from the left and right side to the center. From there they are augered rearward onto the conventional elevating mechanism of a harvester.

In the past, beets have been planted in rows spaced close to one another increase production of a given area of a field. However, harvesters in the past have been made with the discs only mounted along a single lateral row in the harvester frame. However, each pair of discs can only be placed so close to another before they begin to interfere with one another in their operation.

Thus, in order to dig beets which are planted very close to one another laterally, the discs must be placed too close to one another for the each of the pairs of discs to operate free of interference to one another. For this reason the spacing between each row of beets when planted have been larger in the past, with the generally accepted minimum spacing between plants at approximately 16 inches. By mounting another set of discs behind and between the spacing between the first set of discs, the first and second sets of discs will not interfere with one another, and it has been found that the rows of beets planted may be spaced twice as close to one another. For example, by providing the harvester with a second row of discs 24 it has been found that the spacing between plants can be readily reduced to approximately 11 inches, thereby provided nearly doubling the number of beet plants in a given area.

Thus, a novel beet harvesting device is being provided which provides a second set of beet harvesting discs being behind and between each set of a plurality of pairs of discs to enable beets to be harvested, which have been planted with more closely spaced rows.

It will be obvious that various changes and departures may be made to the invention without departing from the spirit and scope thereof, and accordingly, it is not intended that the invention be limited to that specifically described in the specification or as illustrated in the drawings but only as set forth in the appended claims wherein:

What is claimed is:

1. A beet harvester adapted to move frontally and longitudinally comprising a mobile frame, a first lateral frame, a first set of plurality of pairs of beet digging discs mounted at intervals laterally along said first lateral frame, a second lateral frame rearward behind said first frame with a space there between, a second set of a plurality of pairs of beet digging discs mounted at intervals laterally along said second lateral frame, with said intervals of said second set of discs being longitudinally between said intervals of said first of pairs of beet digging discs;

a first laterally extending conveying means in said space laterally between said first and second sets to convey beets dug by said first set to a location beside said first and second set, a second longitudinal extending conveying means, a third conveying means;

said second longitudinally extending conveying means extending longitudinally rearward beside said first and second set of discs so that the first row of digging discs may dig up beets which will be deposited rearward onto said first lateral conveying means which will convey the beets laterally beside the second set onto the second longitudinal conveying means which will convey the beets rearward past the second set of discs onto said third conveying means rear of the second set of discs;

said third conveying means acting to receive beets dug by said second set of discs and combine them with the beets conveyed from the first set of discs, whereupon, the third conveying means will convey the beets from said first and second set of discs rearward of both the first and second set of discs.

2. A beet harvesting apparatus according to claim 1, wherein said first lateral conveying means comprises spiral auger means, and said second conveying means comprises rearward driven belt means.

3. A beet harvester device adapted to move frontally and longitudinally comprising a mobile frame, a first laterally extending horizontal frame, a first plurality of pairs of digging discs mounted at spaced intervals laterally along the length of said first frame for digging beets, a second laterally extending horizontal frame positioned horizontally rearward behind said first laterally extending horizontal frame with a space there between;

a second plurality of pairs of discs mounted at spaced intervals laterally along said second frame behind the first plurality of pairs of discs on said first horizontal frame with said second plurality of pairs of discs positioned at intervals longitudinally between the plurality of pairs of discs on said first frame;

a first lateral conveying means rearward of said first frame and forward of said second frame on said mobile frame in said space there between to convey beets dug by said first plurality of pair of discs laterally past said second plurality of pairs of discs;

a second conveying means positioned laterally beside said second frame and adapted to receive beets from said first lateral conveying means and convey them rearward of said second frame;

a third conveying means rearward of said second frame adapted to receive beets dug by discs of said second frame and receive beets from said second conveying means at a common location, whereby a mechanism at said common location may further convey the beets off the mobile frame.

4. A beet harvester device adapted to move frontally and longitudinally comprising a mobile frame, a first lateral extending horizontal frame, a first plurality of pairs of digging discs mounted at spaced intervals laterally along the length of said first frame for digging beets, a second laterally extending horizontal frame positioned rearward behind said first horizontal frame with a space there between;

a second plurality of pairs of discs mounted at spaced intervals laterally along said second frame behind the first plurality of pairs of discs on said first horizontal frame with said second plurality of pairs of discs positioned at intervals longitudinally between the plurality of pairs of discs on said first frame;

a first conveying means rearward of said first frame on said mobile frame in said space there between to convey beets dug by said first plurality of pair of discs past said second plurality of pairs of discs to a common location on said mobile frame;

conveying means rearward of said second frame adapted to receive beets dug by discs of said second frame and convey beets from said second frame to said common location on the mobile frame whereby the beet may be removed from the mobile frame whereby a mechanism at said common location may further convey the beets off the mobile frame.

\* \* \* \* \*